United States Patent
Okuaki (10) Patent No.: US 11,460,825 B2
(45) Date of Patent: Oct. 4, 2022

(54) QUALITY DETERMINATION DEVICE AND QUALITY DETERMINATION METHOD

(71) Applicant: FANUC CORPORATION, Yamanashi (JP)

(72) Inventor: Kenichi Okuaki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/114,250

(22) Filed: Dec. 7, 2020

(65) Prior Publication Data

US 2021/0181705 A1  Jun. 17, 2021

(30) Foreign Application Priority Data

Dec. 12, 2019  (JP) .............................. JP2019-224569

(51) Int. Cl.
*G05B 19/401*  (2006.01)

(52) U.S. Cl.
CPC .. *G05B 19/401* (2013.01); *G05B 2219/36201* (2013.01); *G05B 2219/37441* (2013.01); *G05B 2219/49196* (2013.01)

(58) Field of Classification Search
CPC .................. G05B 19/401; G05B 2219/36201
See application file for complete search history.

(56) References Cited

U.S. PATENT DOCUMENTS

| | | | | |
|---|---|---|---|---|
| 4,002,960 A | * | 1/1977 | Brookfield | B23Q 15/12 318/257 |
| 4,639,996 A | * | 2/1987 | Fullmer | B23P 19/065 29/407.02 |
| 5,823,356 A | * | 10/1998 | Goodrich | B07C 5/10 209/601 |
| 6,547,565 B1 | * | 4/2003 | Dawood | A61B 17/1628 433/174 |
| 7,059,055 B2 | * | 6/2006 | Wickham | G01B 3/48 33/199 R |
| 8,793,887 B2 | * | 8/2014 | Lange | G01B 7/284 33/199 R |
| 2015/0158157 A1 | * | 6/2015 | Hirabayashi | B25B 23/0064 81/429 |
| 2015/0204642 A1 | * | 7/2015 | DeYaeger | G01B 3/48 33/199 R |
| 2016/0274576 A1 | | 9/2016 | Fujiyama | |
| 2021/0239446 A1 | * | 8/2021 | Tsay | G01B 5/0002 |

FOREIGN PATENT DOCUMENTS

JP  2016-173788 A  9/2016

\* cited by examiner

*Primary Examiner* — Ronald D Hartman, Jr.
(74) *Attorney, Agent, or Firm* — Robert P. Michal, Esq.; Carter, DeLuca & Farrell LLP (57) ABSTRACT

A quality determination device includes an acquisition unit for acquiring a drive current during tapping, from a motor provided in a machine tool that performs tapping, and a determination unit for determining acceptance or rejection of a screw hole formed by the tapping, based on the drive current, an electric power of the motor obtained from the drive current, or a torque of the motor obtained from the drive current.

10 Claims, 8 Drawing Sheets

QUALITY DETERMINATION DEVICE AND QUALITY DETERMINATION METHOD

CROSS-REFERENCE TO RELATED APPLICATION

This application is based upon and claims the benefit of priority from Japanese Patent Application No. 2019-224569 filed on Dec. 12, 2019, the contents of which are incorporated herein by reference.

BACKGROUND OF THE INVENTION

Field of the Invention

The present invention relates to a quality determination device and a quality determination method. In particular, the present invention relates to a quality determination device and a quality determination method for determining the quality (acceptance or rejection) of screw holes formed by tapping.

Description of the Related Art

A machining technology for forming screw holes in an object to be machined (workpiece) by a machine tool equipped with a tool called a tap has been known. Hereinafter, such machining technology will be also referred to as tapping or tapping process.

Japanese Laid-Open Patent Publication No. 2016-173788 discloses that acceptance or rejection of the quality of a screw hole can be determined by screwing in a dedicated thread gauge or a screw, into the screw hole formed by tapping.

SUMMARY OF THE INVENTION

In factories where tapping is performed, a large number of screw holes are formed even in one day. Therefore, if it is attempted to determine acceptance or rejection of the quality of the screw holes by using a thread gauge and the like for all the screw holes, a considerable amount of time and man-hours may be required for such work.

It is therefore an object of the present invention to provide a quality determination device and a quality determination method capable of easily and efficiently determining acceptance or rejection of the quality of screw holes formed by tapping, after the tapping process.

One aspect of the present invention resides in a quality determination device including: an acquisition unit configured to acquire a drive current during tapping, from a motor provided in a machine tool that performs tapping; and a determination unit configured to determine acceptance or rejection of a screw hole formed by the tapping, based on the drive current, an electric power of the motor obtained from the drive current, or a torque of the motor obtained from the drive current.

Another aspect of the present invention resides in a quality determination method including: an acquisition step of acquiring a drive current during tapping, from a motor provided in a machine tool that performs tapping; and a determination step of determining acceptance or rejection of a screw hole formed by the tapping, based on the drive current, an electric power of the motor obtained from the drive current, or a torque of the motor obtained from the drive current.

According to the present invention, it is possible to provide a quality determination device and a quality determination method that can easily and efficiently determine the quality (acceptance or rejection) of screw holes formed by tapping, after the tapping process.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a quality (acceptance/rejection) determination device and a quality (acceptance/rejection) determination method according to the present invention will be detailed by describing a preferred embodiment with reference to the attached drawings.

Embodiment

Figure 1:
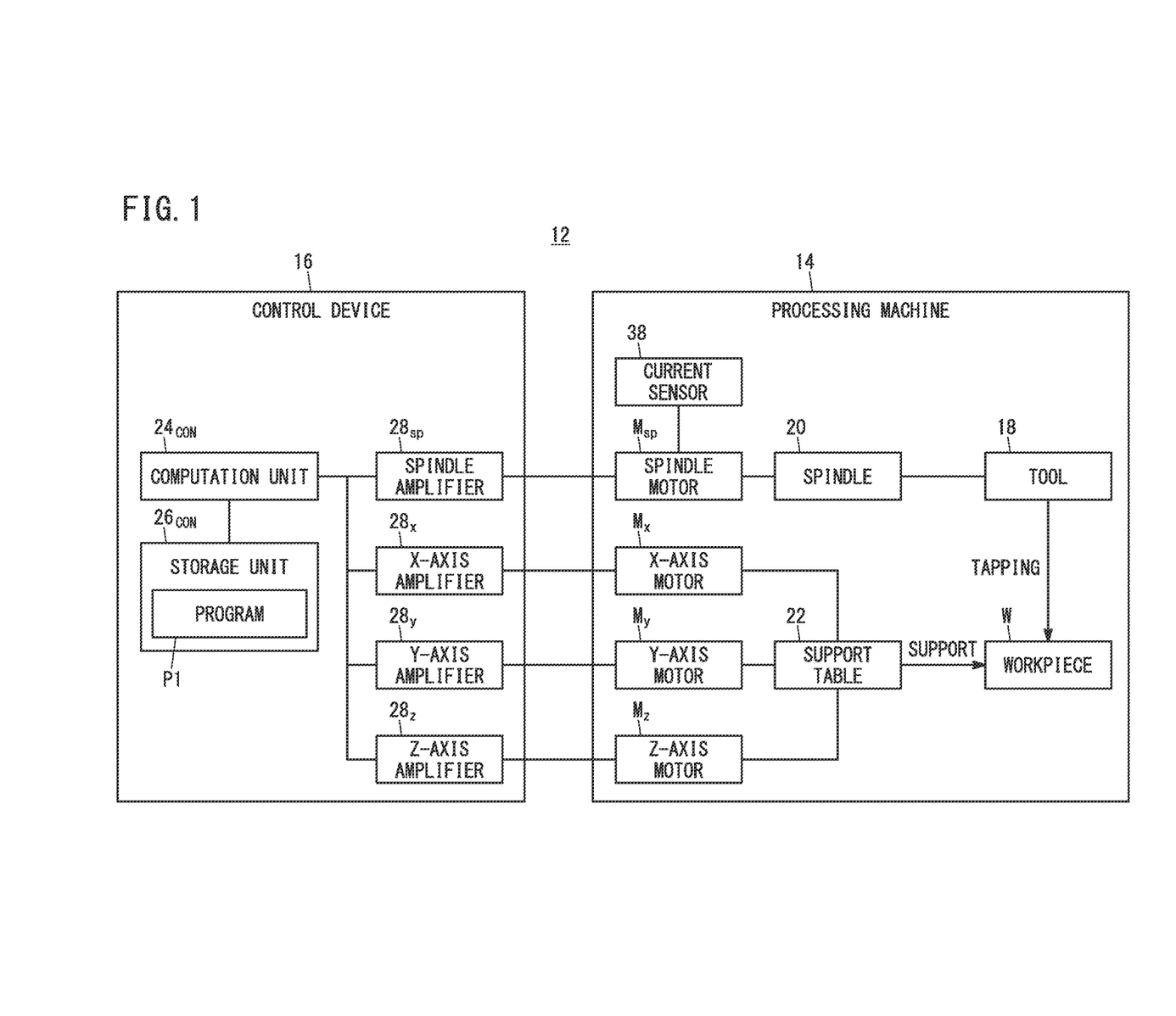
FIG. 1 is a schematic configuration diagram of a machine tool according to an embodiment of the present invention.

FIG. 1 is a schematic configuration diagram showing a configurational example of a machine tool 12 for tapping.

Before explaining a quality determination device 10 of the present embodiment, a configurational example of the machine tool 12 for forming screw holes to be subject to the quality (acceptance/rejection) determination by the quality determination device 10 will be described with reference to FIG. 1.

The machine tool 12 performs tapping on a workpiece W, and includes a processing machine 14 and a control device 16. Of these, the processing machine 14 includes a spindle 20 to which a tool 18 also called a tap is attached, and a spindle motor $M_{sp}$ connected to the spindle 20. Further, the processing machine 14 further includes a support table 22 for supporting the workpiece W to be tapped, and an X-axis motor $M_x$, a Y-axis motor $M_y$, and a Z-axis motor $M_z$ connected to the support table 22.

Of these, the spindle motor $M_{sp}$ is a spindle motor that rotates the tool 18. The X-axis motor $M_x$, the Y-axis motor $M_y$, and the Z-axis motor $M_z$ are servomotors that move the support table 22 in the X-axis direction, the Y-axis direction, and the Z-axis direction, respectively. The X-axis direction, the Y-axis direction, and the Z-axis direction are directions orthogonal to each other. Further, in the following description, when the spindle motor $M_{sp}$, the X-axis motor $M_x$, the Y-axis motor $M_y$, and the Z-axis motor $M_z$ are described without distinction, they may be collectively referred to as "motor M".

The control device 16 is a numerical control device generally also referred to as a CNC (Computer Numerical Control). The control device 16 includes a computation unit $24_{CON}$, a storage unit $26_{CON}$, a spindle amplifier $28_{sp}$, an X-axis amplifier $28_x$, a Y-axis amplifier $28_y$, and a Z-axis amplifier $28_z$.

The computation unit $24_{CON}$ includes hardware such as a CPU (Central Processing Unit) in the configuration thereof.

The storage unit $26_{CON}$ includes hardware such as a RAM (Random Access Memory) and a ROM (Read Only Memory) in the configuration thereof. The storage unit $26_{CON}$ stores therein a predetermined program P1 required for executing tapping. This predetermined program P1 can be read and executed by the computation unit $24_{CON}$.

The spindle amplifier $28_{sp}$ is an amplifier connected to the computation unit $24_{CON}$ and the spindle motor $M_{sp}$, and receives a command from the computation unit $24_{CON}$ to control the spindle motor $M_{sp}$. The X-axis amplifier $28_x$, the Y-axis amplifier $28_y$, and the Z-axis amplifier $28_z$ receives a command from the computation unit $24_{CON}$ to control the X-axis motor $M_x$, the Y-axis motor $M_y$, and the Z-axis motor $M_z$.

In the machine tool 12, the control device 16 controls the spindle motor $M_{sp}$, the X-axis motor $M_x$, the Y-axis motor $M_y$, and the Z-axis motor $M_z$ based on a predetermined program P1 to thereby perform tapping to form a screw hole having a predetermined size on the workpiece W. The configuration of the machine tool 12 for tapping is not limited to the above. For example, at least one of the X-axis motor $M_x$, the Y-axis motor $M_y$, and the Z-axis motor $M_z$ may be connected to the spindle 20 instead of the support table 22. Further, the X-axis motor $M_x$, the Y-axis motor $M_y$, and the Z-axis motor $M_z$ may be a linear motor instead of a servo motor.

Next, the quality determination device 10 of the present embodiment will be described. The quality determination device 10 determines acceptance or rejection of the quality of the screw holes formed in the workpiece W by tapping performed by the machine tool 12.

Figure 2:
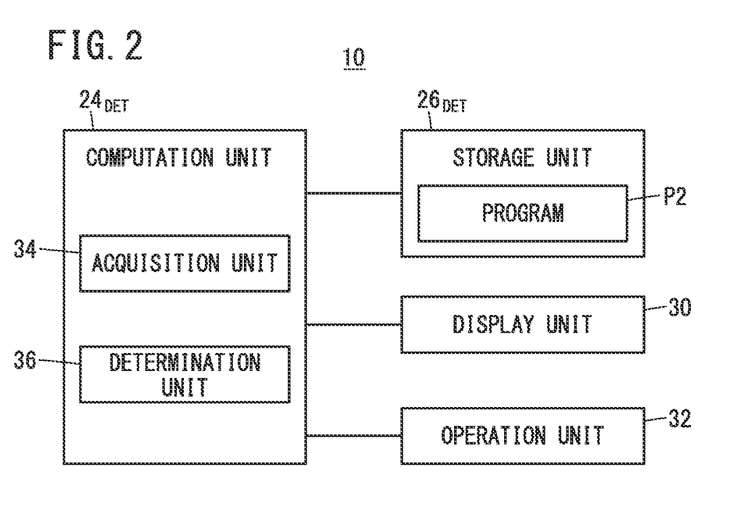
FIG. 2 is a schematic configuration diagram of a quality determination device of the embodiment.

FIG. 2 is a schematic configuration diagram of the quality determination device 10 of the embodiment.

The quality determination device 10 includes a computation unit $24_{DET}$, a storage unit $26_{DET}$, a display unit 30, and an operation unit 32.

The computation unit $24_{DET}$ includes hardware such as a CPU in the configuration thereof. The storage unit $26_{DET}$ includes hardware such as RAM and ROM in the configuration thereof. The storage unit $26_{DET}$ stores a predetermined program P2 necessary for executing the screw hole quality determination method of the present embodiment. The predetermined program P2 can be read and executed by the computation unit $24_{DET}$.

The display unit 30 is, for example, a display device equipped with a liquid crystal display screen. On the display unit 30, the result of the determination on acceptance or rejection of the screw holes and information used in the process of determining acceptance or rejection of the screw holes are appropriately displayed.

The operation unit 32 enables the operator to give instructions or commands to the quality determination device 10, and is made up of, for example, a mouse, a keyboard, a touch panel attached on the screen of the display unit 30, or a combination thereof. The instruction or command issued by the operator includes, for example, a request to start or stop the quality determination, but is not particularly limited thereto.

The computation unit $24_{DET}$ will be further described. The computation unit $24_{DET}$ includes an acquisition unit 34 and a determination unit 36. Each of these units can be realized by the computation unit $24_{DET}$ executing a predetermined program P2.

The acquisition unit 34 acquires a drive current during tapping, from the motors M included in the machine tool 12. Here, it is sufficient for the acquisition unit 34 to just acquire the drive current during tapping, from one motor selected as appropriate from the multiple motors M in the machine tool 12. The acquisition unit 34 receives input of the detection result from a current sensor 38 provided in the target motor M whose drive current is to be detected to thereby acquire the drive current of the motor M that is being tapped. As an example, FIG. 1 shows a configuration in which the current sensor 38 is disposed on the spindle motor $M_{sp}$. In this case, the acquisition unit 34 can acquire the drive current of the spindle motor $M_{sp}$ during tapping.

The determination unit 36 determines acceptance or rejection of the screw hole formed by the tapping, based on whether or not the drive current of the motor M during tapping falls within a previously defined range.

Hereinafter, the above "previously defined range" is also described as "predetermined range". The predetermined range is defined as a permissible range of error of a drive current that can be obtained during tapping in which an ideal screw hole is formed (such a drive current will be hereinafter also referred to as "reference current"). The predetermined range can be defined experimentally.

Figure 3A:
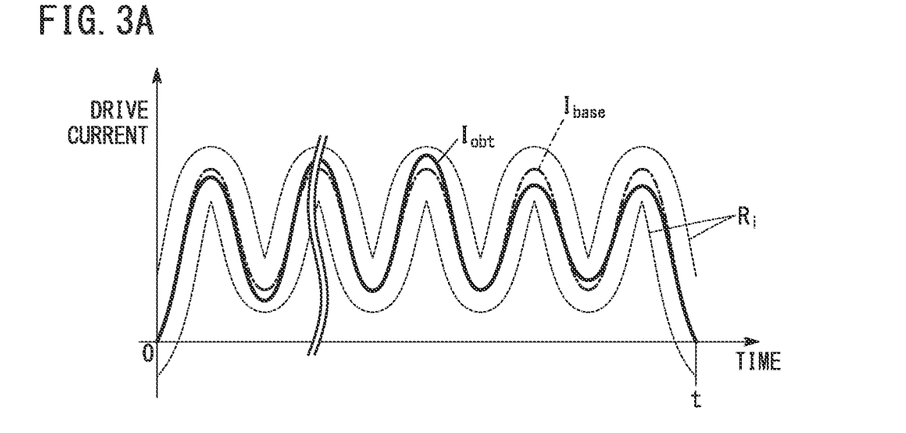
FIG. 3A is a graph showing an example of a case where a drive current falls within a predetermined range.

FIG. 3A is a graph showing an example when the drive current falls within the predetermined range. In the graph of FIG. 3A, the vertical axis represents the drive current, and the horizontal axis represents time (0: the start time of tapping, t: the end time of tapping). In FIG. 3A, part of the time zones is omitted.

In FIG. 3A, $I_{base}$ (chain line) is a waveform example of the reference current. $R_i$ (dotted line) represents the predetermined range defined based on the reference current. $I_{obt}$ (solid line) is a waveform example of the drive current acquired during tapping. When the drive current remains within the predetermined range, during a time period from the start to the end of tapping (also including the time zone omitted in FIG. 3A), the screw hole formed by the tapping tends to have acceptance quality.

Figure 3B:
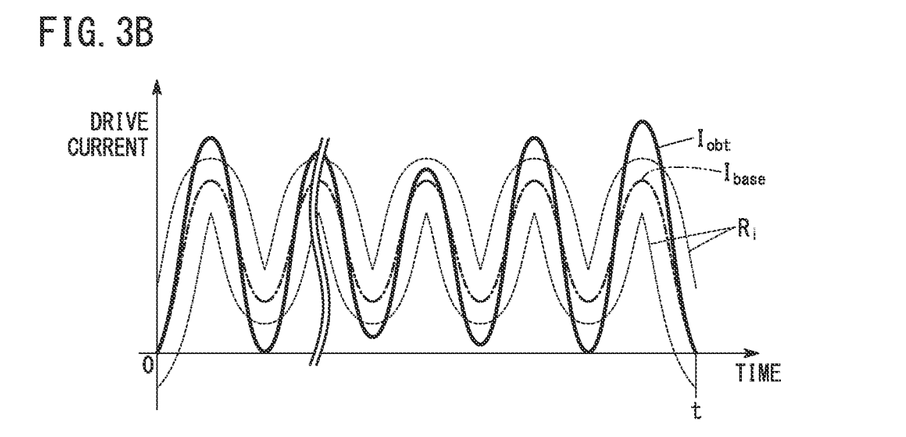
FIG. 3B is a graph showing an example of a case where the drive current does not fall within the predetermined range.

FIG. 3B is a graph showing an example when the drive current does not fall within the predetermined range. In the graph of FIG. 3B, the vertical axis and the horizontal axis represent the same as those of FIG. 3A.

As shown in FIG. 3B, when the drive current ($I_{obt}$) during tapping does not fall within the predetermined range ($R_i$) determined based on the reference current ($I_{base}$), the screw hole formed by the tapping tends to have rejection quality.

The determination unit 36 makes a determination based on the above. That is, when the drive current of the motor M during tapping, acquired by the acquisition unit 34, is within the predetermined range, the determination unit 36 of the present embodiment determines that the screw hole formed by the tapping has acceptance quality (i.e., the screw hole is accepted in terms of quality). On the other hand, when the drive current during tapping is not within the predetermined range, the determination unit 36 determines that the screw hole formed by the tapping has rejection quality (i.e., the screw hole is rejected in terms of quality).

As described above, in the present embodiment, the determination unit 36 included in the quality determination device 10 determines acceptance or rejection of the screw holes based on the drive current of the motor M during tapping.

The determination result made by the determination unit 36 (hereinafter, also simply referred to as "determination result") can be displayed on the display unit 30 to thereby notify the operator of the result. At this time, it is not necessary to display all the determination results. For example, only the results of determination on rejection may be notified.

Further, the determination results may be cumulatively stored in the storage unit $26_{DET}$ in association with the identification information for identifying the screw holes. The identification information is not particularly limited, but may use, for example, letters, numbers, symbols or combinations thereof, which are allotted, as appropriate, for management in a factory where tapping is performed.

The information that can be associated with the determination results is not limited to the above identification information. For example, the determination result and the identification information may be further associated with information indicating the correctness of the determination result (i.e., whether the determination result is correct or wrong). The correctness of the determination result is determined when a screw is tightened in the screw hole, for example, in the assembly stage of the industrial product performed after the quality determination.

The determination results cumulatively stored in the storage unit $26_{DET}$ may be appropriately referred to by the operator by making access from a terminal connected to the storage unit $26_{DET}$ via a communication line. Further, the operator may use the identification information as a key to check the determination result associated with the identification information and the correctness of the determination result. With this configuration, the traceability of the article formed with screw holes can be improved.

The above is a configuration example of the quality determination device 10 of the present embodiment. Subsequently, the quality determination method of the present embodiment (hereinafter, also simply referred to as "quality determination method") will be described. The quality determination method is executed by the above-described quality determination device 10.

Figure 4:
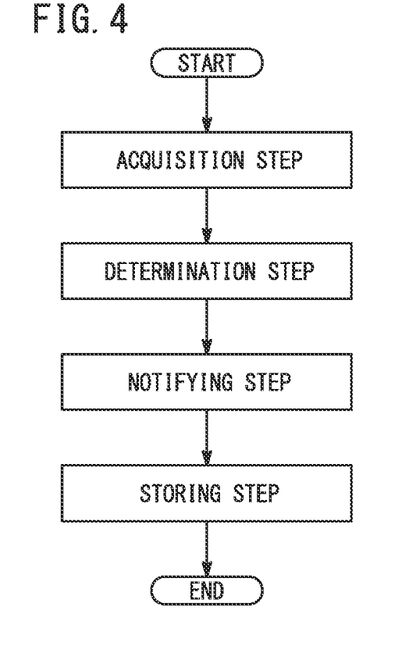
FIG. 4 is a flowchart showing a flow of a quality determination method of an embodiment of the present invention.

FIG. 4 is a flowchart showing a flow of the quality determination method of the embodiment.

As shown in FIG. 4, the quality determination method includes an acquisition step and a determination step. Further, the quality determination method may further include a notifying step and a storing step. Hereinafter, all the steps will be described sequentially.

The acquisition step is a step executed when tapping is performed by the machine tool 12. In this step, the acquisition unit 34 acquires the drive current during tapping from the motor M.

The determination step is a step executed after the acquisition step. In this step, the determination unit 36 determines acceptance or rejection of the screw hole formed by the tapping, based on the drive current acquired at the acquisition step. The determination at this time is made based on whether or not the drive current falls within a predetermined range.

The notifying step is a step that can be executed after the determination step. In this step, the display unit 30 displays the result (determination result) determined at the determination step. Thus, the operator is notified of the determination result.

The operator who received the notification issued at the notifying step can promptly grasp the acceptance or rejection of the screw hole formed by the tapping process. It should be noted that this step may be performed only when the determination result shows rejection quality, and may be skipped when the determination result shows acceptance quality.

Note that the notification format at the notifying step is not limited to displaying the determination result on the display unit 30. For example, a notifying lamp or a speaker may be provided as appropriate in the quality determination device 10, so as to notify the operator of the determination result by turning on the notifying lamp or emitting a sound from the speaker.

The storing step is a step that can be executed after the determination step. Though the storing step is performed after the notifying step in FIG. 4, the notifying step and the storing step may be done in no particular order.

In the storing step, the storage unit $26_{DET}$ cumulatively stores the identification information for identifying the screw holes and the determination results as to the screw holes at the determination step in association with each other. The cumulatively stored determination results can be retrieved later by the operator using the identification information as a key. The retrieved determination result is displayed on the display unit 30.

The above is an example of the configuration of the quality determination method of the present embodiment. The determination step in the above-mentioned quality determination method is performed based on the drive current of the motor M during tapping. Therefore, according to the quality determination method of the present embodiment, each time a tapping process is performed, acceptance or rejection of the screw hole formed by the tapping process is promptly determined, ideally, almost at the same time as when the tapping process is completed.

Thus, according to the present embodiment, the quality determination device 10 and the quality determination method which can easily and efficiently determine acceptance or rejection of a screw hole formed by tapping after the tapping process are provided.

[Modification]

The embodiment has been described above as an example of the present invention. Various modifications and improvements can be added to the above embodiment. It is also apparent from the scope of claims that the embodiments added with such modifications and improvements may be incorporated in the technical scope of the invention.

(Modification 1)

The determination unit 36 of the embodiment determines acceptance or rejection of the screw hole, based on whether or not the drive current falls within a predetermined range. The mode of determination that the determination unit 36 can adopt is not limited to this.

For example, the quality determination device 10 may calculate the electric power or torque of the motor M during tapping, from the drive current of the motor M during the tapping. Further, the quality (acceptance or rejection) of the screw hole formed by the tapping may be determined based on whether or not the electric power or torque of the motor M during the tapping falls within a predetermined range.

In relation to the above, a configuration of the quality determination device 10 of this modification will be described. However, in the following, the description of the items already explained in the above embodiment will be omitted as appropriate.

Figure 5:
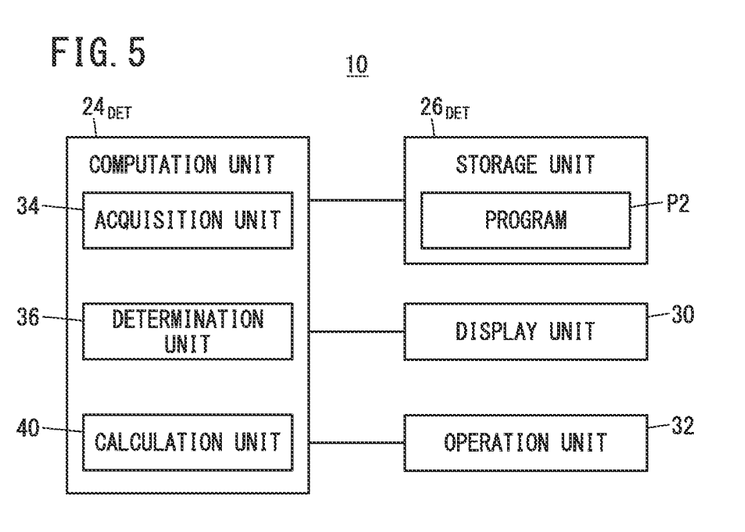
FIG. 5 is a schematic configuration diagram of a quality determination device of Modification 1.

FIG. 5 is a schematic configuration diagram of a quality determination device 10 of Modification 1.

The quality determination device 10 of this modification further includes a calculation unit 40 that calculates the electric power or torque of the motor M during tapping, from the drive current by a predetermined arithmetic operation.

Further, the determination unit 36 of this modification determines acceptance or rejection of the screw hole formed by the tapping, based on whether or not the electric power or torque during the tapping, calculated by the calculation unit 40, falls within a predetermined range.

The predetermined range for the electric power, which is required for the determination unit 36 to make determination based on the electric power, and the predetermined range for the torque, which is required for the determination unit 36 to make determination based on the torque, can be determined experimentally, as when determining the predetermined range for the drive current.

This configuration, similarly to the above embodiment, provides the quality determination device 10 and the quality determination method which can easily and efficiently determine acceptance or rejection of a screw hole formed by tapping, after the tapping process.

(Modification 2)

In the above, cases have been described that acceptance or rejection of a screw hole can be determined based on whether or not or not the drive current, the electric power, or the torque of the motor M that is being tapped falls within a predetermined range. Modes of determination that the determination unit 36 can adopt are not limited to these.

For example, the quality determination device 10 may determine the quality (acceptance or rejection) of the screw hole, based on whether or not the frequency of the drive current, the electric power, or the torque falls within a previously defined frequency range (hereinafter, also referred to as "predetermined frequency range").

In relation to this, a configuration of a quality determination device 10 of this modification will be described. However, in the following, the explanation of the items already explained so far will be omitted as appropriate.

Figure 6:
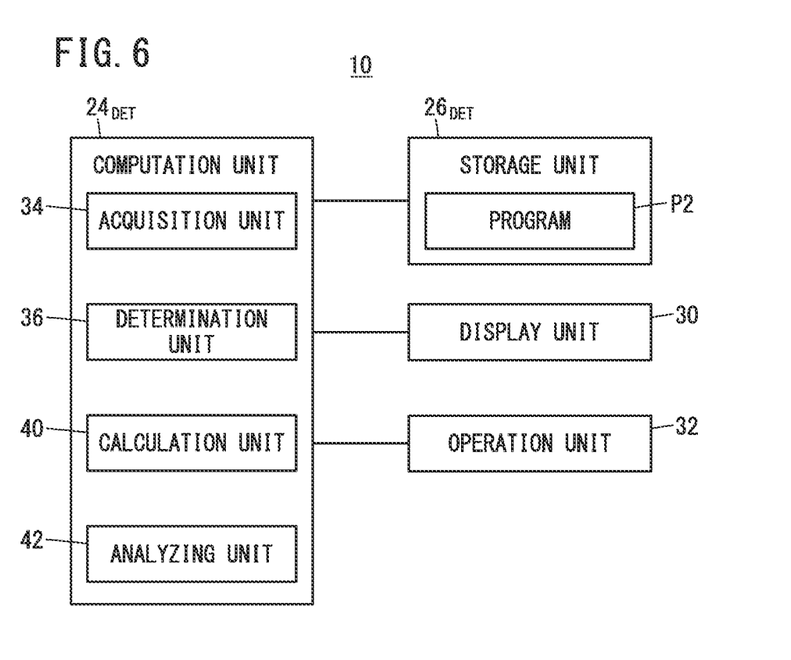
FIG. 6 is a schematic configuration diagram of a quality determination device of Modification 2.

FIG. 6 is a schematic configuration diagram of a quality determination device 10 of Modification 2.

The quality determination device 10 of this modification further includes an analyzing unit 42 that performs frequency analysis on the drive current, the electric power, or the torque. In this modification, the analyzing unit 42 performs frequency analysis to specify a frequency or frequencies of the drive current, the electric power, or the torque.

The predetermined frequency range is specified as a permissible range of error of the frequency of the drive current, the electric power or the torque that can be obtained in tapping in which an ideal screw hole is formed. The predetermined frequency range may be defined as having a plurality of frequency ranges.

Figure 7A:
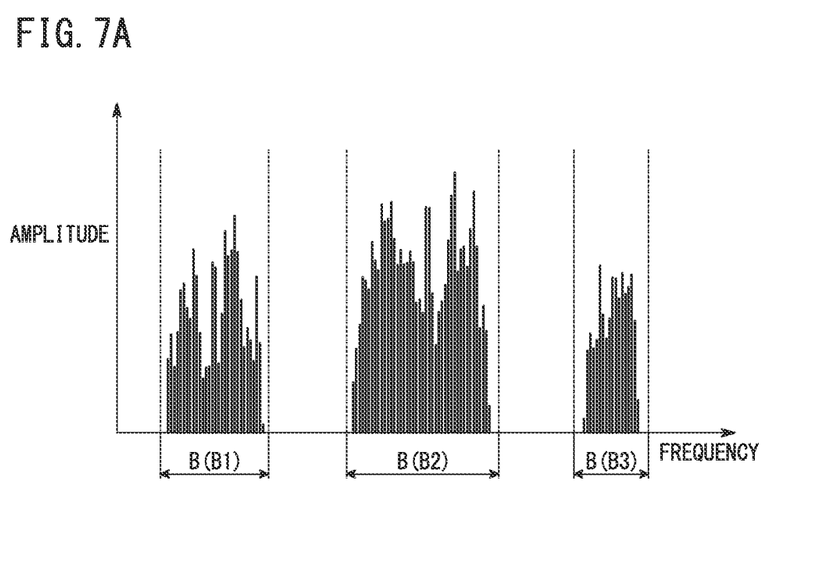
FIG. 7A is a graph showing an example of a case where the torque frequency falls within a predetermined frequency range.

FIG. 7A is a graph showing an example of a case where the torque frequency falls within a predetermined frequency range. In the graph of FIG. 7A, the vertical axis represents the amplitude and the horizontal axis represents the frequency.

In the example of FIG. 7A, the predetermined frequency range B has three frequency ranges, i.e., range B1, range B2, and range B3. As shown in FIG. 7A, when the frequency of the torque during tapping falls within the predetermined frequency range (ranges B1 to B3), the screw hole formed by the tapping tends to have acceptance quality. This concept also applies to drive current and electric power.

Figure 7B:
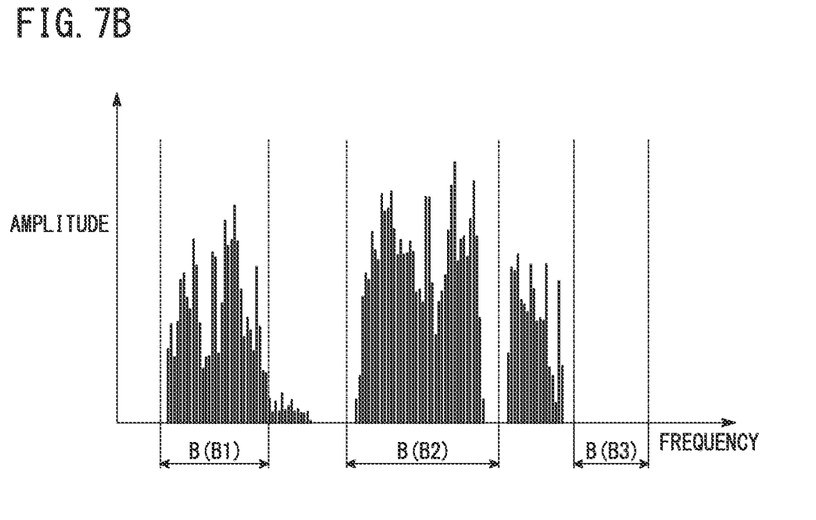
FIG. 7B is a graph showing an example of a case where the torque frequency does not fall within the predetermined frequency range.

FIG. 7B is a graph showing an example when the torque frequency does not fall within the predetermined frequency range. In the graph of FIG. 7B, the vertical axis and the horizontal axis represent the same as those of FIG. 7A.

As shown in FIG. 7B, when the frequency of the torque during tapping does not fall within the predetermined frequency range (ranges B1 to B3), the screw hole formed by the tapping has rejection quality. This concept also applies to drive current and electric power.

The determination unit 36 makes a determination based on the above. That is, the determination unit 36 of this modification determines that the screw hole formed by the tapping has acceptance quality if the frequency of the driving current, the electric power or the torque during the tapping falls within a predetermined frequency range. On the other hand, if the frequency of the driving current, the electric power or the torque during tapping does not fall within the predetermined frequency range, the determination unit 36 determines that the screw hole formed by the tapping has rejection quality.

Thus, this modification, similarly to the above embodiment, provides the quality determination device 10 and the quality determination method which can easily and efficiently determine the quality (acceptance or rejection) of a screw hole formed by tapping after the tapping process.

(Modification 3)

In the above, it has been explained that acceptance or rejection of a screw hole can be determined based on whether or not the drive current, the electric power, or the torque of the motor M that is being tapped falls within a predetermined range. It has been also explained that acceptance or rejection of a screw hole can be determined based on whether or not the frequency of the drive current, the electric power or the torque falls within a predetermined frequency range. The mode of determination that the determination unit 36 can adopt is not limited to these.

For example, the quality determination device 10 may determine acceptance or rejection of the screw hole by using a prediction model 44, which is generally also called a "machine learning model" or simply a "learning model".

In relation to this, a configuration of a quality determination device 10 of this modification will be described. However, in the following, the explanation of the items already explained so far will be omitted as appropriate.

Figure 8:
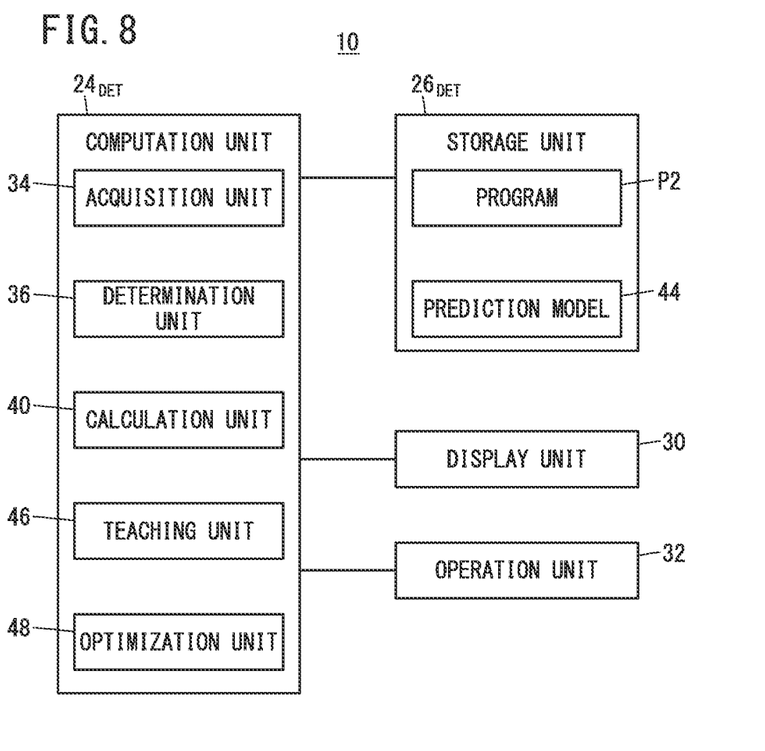
FIG. 8 is a schematic configuration diagram of a quality determination device of Modification 3.

FIG. 8 is a schematic configuration diagram of a quality determination device 10 of Modification 3.

The prediction model 44 of this modification predicts the quality (acceptance or rejection) of a screw hole based on at least one of the drive current, the electric power, and the torque. The prediction model 44 can be constructed on the basis of experiments and stored in the storage unit $26_{DET}$.

The prediction model 44 that outputs a prediction result for input information is constructed by using a well-known algorithm in the field of machine learning. The constructed prediction model 44 has a structure generally also called a "multilayer neural network (neural network)". Next, the concept of the neural network, which itself is already known, will be described in light of a case where it is applied to the prediction model 44 of this modification.

The neural network generates a new value (neuron) by adding a weight to each component of a vector serving as input, adding up all the weighted components, and applying a predetermined activation function to the result. The components of the vector serving as input include at least one of the drive current, the electric power, and the torque of the motor M in this modification. The weights and activation function required to generate neurons can be experimentally selected by the designer of the prediction model 44.

Generation of a neuron is performed multiple times for the same vector, with different weights. As a result, multiple neurons are generated based on the same vector, and a new vector having the multiple neurons as its components is generated. The number of times that generation of neuron is performed can be experimentally selected by the designer of the prediction model 44, as in the case of the weights and activation function.

The prediction model 44 iterates the above-described weighting and adding up for the generated vector, and finally generates one neuron. The finally generated neuron is information that represents the quality (acceptance or rejection) of the screw hole in this modification.

The determination unit 36 of this modification determines acceptance or rejection of the screw hole by using the above prediction model 44. That is, the determination unit 36 of this modification gives, as input, at least one of the drive current, the electric power, and the torque of the motor M during tapping, to the prediction model 44, and acquires, as its own determination result, the prediction result indicated by the neuron that is output in response to the drive current, the electric power, or the torque.

Thus, the quality determination (determination on acceptance or rejection) of screw holes can also be made by using the prediction model 44. Here, the accuracy of prediction by the prediction model 44 having such a neural network structure changes depending on the number of layers of the neural network, the type of activation function of the prediction model 44, and the setting of weights. In other words, it is possible to expect that optimization of the number of layers of the neural network constituting the prediction model 44, the type of activation function of the prediction model 44, and the setting of weights, can further improve the accuracy of prediction of the prediction model 44.

In relation to the above, the quality determination device 10 of this modification may further include a teaching unit 46 and an optimization unit 48 as described below. Hereinafter, description on these will be given.

The correctness of the determination result (i.e., whether or not the prediction by the prediction model 44 is correct) is input to the teaching unit 46. The correctness of the determination result is verified, for example, by the operator performing a general thread gauge test on the screw hole or by actually tightening the screw into the screw hole. The operator can input the verified result to the teaching unit 46 via the operation unit 32. When the correctness or wrongness of the determination result is taught, the teaching unit 46 invokes the optimization unit 48 and inputs the content of teaching input by the operator to the optimization unit 48.

To the optimization unit 48, the following items are input: information (drive current, etc.) input to the prediction model 44 at the time of determining acceptance or rejection; a result of determination on the input information (prediction result of the prediction model 44); and the correctness or wrongness of the prediction result. Of these, the correctness or wrongness of the prediction result is input from the teaching unit 46 as described above. The information input to the prediction model 44 and the result of determination on the input information may be input by the operator via the operation unit 32 in response to the request of the optimization unit 48. Alternatively, the information input to the prediction model 44, the result of prediction on the input information, and the correctness or wrongness of the prediction result may be associated with each other and stored cumulatively in the storage unit $26_{DET}$ so as to be referred to by the optimization unit 48.

The optimization unit 48 optimizes the prediction model 44 such that the result of determination on the information input to the prediction model 44 at the time of determining acceptance or rejection is consistent with correctness or wrongness of the prediction result. This optimization is performed by appropriately changing at least one of the number of layers of the neural network constituting the prediction model 44, the type of activation function of the prediction model 44, and the weight setting.

The above is an example of the configuration of this modification. In this modification, the accuracy of the acceptance/rejection determination can be expected to be improved by repeating the prediction by the prediction model 44, the teaching of correctness or wrongness of the prediction result, and the optimization of the prediction model 44 based on the teaching.

Note that the prediction model 44 may predict acceptance or rejection of the screw hole based on, for example, the positional deviation and/or the degree of wear of the tool 18 in addition to at least one of the drive current, the electric power, and the torque. That is, the prediction model 44 may predict acceptance or rejection of the quality of the screw hole by further inputting at least one of the positional deviation and the degree of wear in addition to at least one of the drive current, the electric power, and the torque.

The positional deviation is a difference between a command issued by the computation unit $24_{CON}$ to the spindle amplifier $28_{sp}$, the X-axis amplifier $28_x$, the Y-axis amplifier $28_y$, and the Z-axis amplifier $28_z$, and the feedback from the motor M driven in response to the command. For example, suppose that when the computation unit $24_{CON}$ issues, to the spindle amplifier $28_{sp}$, a command to rotate the spindle motor $M_{sp}$ at a rotation amount r, the feedback rotation amount from the spindle motor $M_{sp}$ that has rotated in response to the command is r'. In this case, the positional deviation for the spindle motor $M_{sp}$ can be given based on the difference (r–r') between the commanded rotation amount r and the feedback rotation amount r'.

Further, the degree of wear of the tool 18 can be obtained by observing the state of the tool 18, or also can be known by, for example, the number of times the same tool 18 has been consecutively used for tapping.

Use of the positional deviation and/or the degree of wear of the tool 18 for prediction, in addition to at least one of the drive current, the electric power, and the torque, makes it possible to expect further improvement in prediction accuracy of the prediction model 44.

[Invention Obtained from the Embodiment]

The inventions that can be grasped from the above embodiment and modifications are described below.

<First Invention>

A quality determination device (10) includes: an acquisition unit (34) configured to acquire a drive current during tapping, from a motor (M) provided in a machine tool (12) that performs tapping; and a determination unit (36) configured to determine the quality (acceptance or rejection) of a screw hole formed by the tapping, based on the drive current, the electric power of the motor (M) obtained from the drive current, or the torque of the motor (M) obtained from the drive current.

This configuration provides a quality determination device (10) that can easily and efficiently determine acceptance or rejection of a screw hole formed by tapping, after the tapping process.

The determination unit (36) may be configured to determine acceptance or rejection of the screw hole, based on whether or not the drive current, the electric power, or the torque falls within a predetermined range. This configuration provides a quality determination device (10) that can easily and efficiently determine acceptance or rejection of a screw hole, based on whether or not the drive current, the electric power, or the torque falls within a predetermined range.

The above quality determination device may further include an analyzing unit (42) configured to perform frequency analysis on the drive current, the electric power, or the torque, and the determination unit (36) may be configured to determine acceptance or rejection of the screw hole, based on whether or not the frequency of the drive current, the electric power, or the torque falls within a predetermined frequency range. This configuration provides a quality determination device (10) that can easily and efficiently determine the quality (acceptance or rejection) of the screw hole, based on whether or not the frequency of the drive current, the electric power, or the torque falls within a predetermined frequency range.

The determination unit (36) may be configured to determine acceptance or rejection of the screw hole by using a prediction model (44) configured to predict acceptance or rejection of the screw hole, based on at least one of the drive current, the electric power, and the torque. The quality determination device (10) may further include: a teaching unit (46) configured to receive input of correctness or wrongness of the prediction made by the prediction model (44); and an optimization unit (48) configured to optimize the prediction model (44) based on the input correctness or wrongness of the prediction. With this configuration, it is possible to improve the accuracy of the acceptance/rejection determination by iteration of the prediction by the prediction model (44), the teaching of correctness or wrongness of the prediction result, and the optimization of the prediction model (44) based on the teaching.

The quality determination device (10) may further include a storage unit ($26_{DET}$) configured to cumulatively store the identification information for identifying the screw hole and the determination result on the screw hole by the determination unit (36) in association with each other. This configuration can improve the traceability of the article with screw holes formed therein.

<Second Invention>

A quality determination method includes: an acquisition step of acquiring a drive current during tapping, from a motor (M) provided in a machine tool (12) that performs tapping; and a determination step of determining acceptance or rejection of a screw hole formed by the tapping, based on the drive current, the electric power of the motor (M) obtained from the drive current, or the torque of the motor (M) obtained from the drive current.

This method provides a quality determination method that can easily and efficiently determine acceptance or rejection of the screw hole formed by tapping, after the tapping process.

The determination step may determine acceptance or rejection of the screw hole, based on whether or not the drive current, the electric power, or the torque falls within a predetermined range. This method provides a quality determination method that can easily and efficiently determine acceptance or rejection of a screw hole, based on whether or not the drive current, the electric power, or the torque falls within a predetermined range.

The quality determination method may further include an analyzing step of performing frequency analysis on the drive current, the electric power, or the torque, and the determination step may be performed after the analyzing step and determine acceptance or rejection of the screw hole, based on whether or not the frequency of the drive current, the electric power, or the torque falls within a predetermined frequency range. This method provides a quality (acceptance/rejection) determination method that can easily and efficiently determine acceptance or rejection of the screw hole, based on whether or not the frequency of the drive current, the electric power, or the torque falls within a predetermined frequency range.

The determination step may determine acceptance or rejection of the screw hole by using a prediction model (44) configured to predict acceptance or rejection of the screw hole, based on at least one of the drive current, the electric power, and the torque. The quality determination method may further include: a teaching step, performed after the determination step, of teaching correctness or wrongness of the prediction made by the prediction model (44); and an optimization step of optimizing the prediction model (44) based on the taught correctness or wrongness of the prediction. With this method, it is possible to improve the accuracy of the quality (acceptance/rejection) determination by iteration of the prediction by the prediction model (44), the teaching of correctness or wrongness of the prediction result, and the optimization of the prediction model (44) based on the teaching.

The quality determination method may further include a storing step of cumulatively storing the identification information for identifying the screw hole, and the determination result on the screw hole at the determination step, in association with each other. This method can improve the traceability of the article with the screw holes formed therein.

What is claimed is:

1. A quality determination device, comprising:
one or more processors that execute computer-executable instructions stored in a memory, wherein the one or more processors execute the computer-executable instructions to cause the quality determination device to:
    acquire a drive current during tapping, from a motor provided in a machine tool that forms a screw hole in a workpiece by the tapping; and
    determine acceptance or rejection of the screw hole formed by the tapping, based on the drive current, an electric power of the motor obtained from the drive current, or a torque of the motor obtained from the drive current during the formation of the screw hole.

2. The quality determination device according to claim 1, wherein the one or more processors is configured to determine acceptance or rejection of the screw hole, based on whether or not the drive current, the electric power, or the torque falls within a predetermined range.

3. The quality determination device according to claim 1, wherein the one or more processors is configured to perform frequency analysis on the drive current, the electric power, or the torque,
    wherein the one or more processors is configured to determine acceptance or rejection of the screw hole, based on whether or not a frequency of the drive current, the electric power, or the torque falls within a predetermined frequency range.

4. The quality determination device according to claim 1, wherein the one or more processors is configured to determine acceptance or rejection of the screw hole by using a prediction model configured to predict acceptance or rejection of the screw hole, based on at least one of the drive current, the electric power, and the torque, the one or more processors being further configured to:
receive input of correctness or wrongness of prediction made by the prediction model; and
optimize the prediction model based on the input correctness or wrongness of the prediction.

5. The quality determination device according to claim 1, wherein the memory is configured to cumulatively store identification information for identifying the screw hole and a determination result on the screw hole by the one or more processors in association with each other.

6. A quality determination method performed by executing, by one or more processors, computer-executable instructions stored in a memory, the method comprising:

an acquisition step of acquiring, by the one or more processors, a drive current during tapping, from a motor of a machine tool that forms a screw hole in a workpiece by the tapping; and
a determination step of determining, by the one or more processors, acceptance or rejection of the screw hole formed by the tapping, based on the drive current, an electric power of the motor obtained from the drive current, or a torque of the motor obtained from the drive current during the formation of the screw hole.

7. The quality determination method according to claim 6, wherein the determination step determines acceptance or rejection of the screw hole, based on whether or not the drive current, the electric power, or the torque falls within a predetermined range.

8. The quality determination method according to claim 6, further comprising an analyzing step of performing frequency analysis on the drive current, the electric power, or the torque, wherein the determination step is performed after the analyzing step, and determines acceptance or rejection of the screw hole, based on whether or not a frequency of the drive current, the electric power, or the torque falls within a predetermined frequency range.

9. The quality determination method according to claim 6, wherein the determination step determines acceptance or rejection of the screw hole by using a prediction model configured to predict acceptance or rejection of the screw hole, based on at least one of the drive current, the electric power, and the torque, the quality determination method, further comprising:
a teaching step, performed after the determination step, of teaching correctness or wrongness of prediction made by the prediction model; and
an optimization step of optimizing the prediction model based on the taught correctness or wrongness of the prediction.

10. The quality determination method according to claim 6, further comprising a storing step of cumulatively storing identification information for identifying the screw hole and a determination result on the screw hole at the determination step in association with each other.

* * * * *